May 29, 1928.
E. M. BROGDEN
1,671,924
ART OF HANDLING FRESH FRUITS
Filed July 23, 1923   3 Sheets-Sheet 1
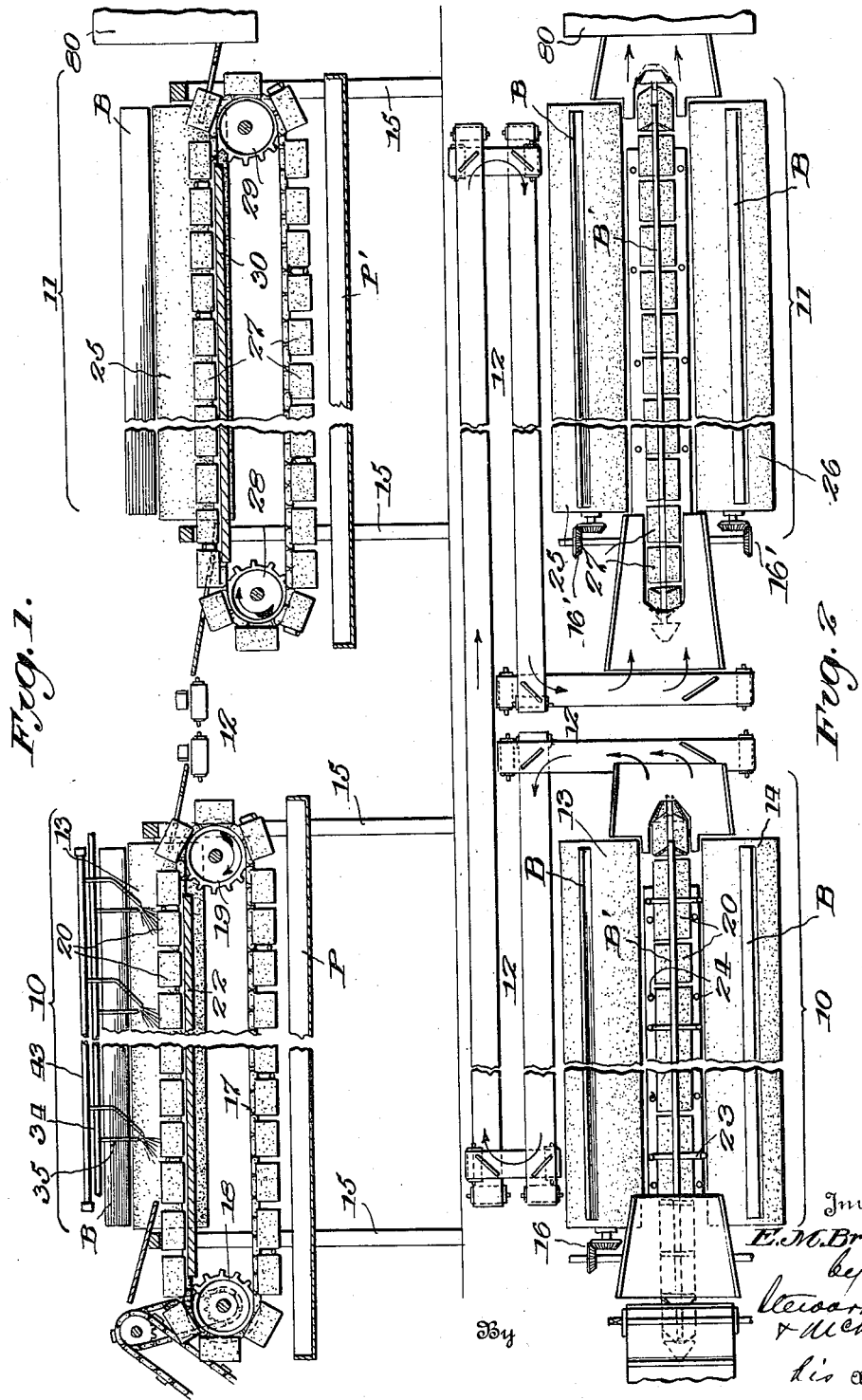

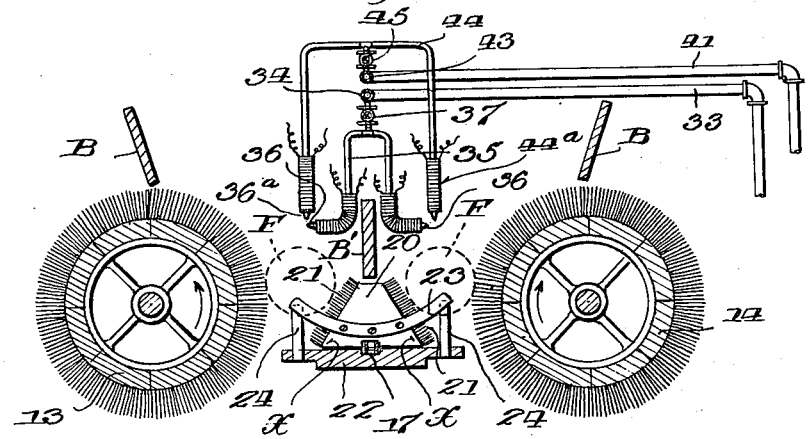
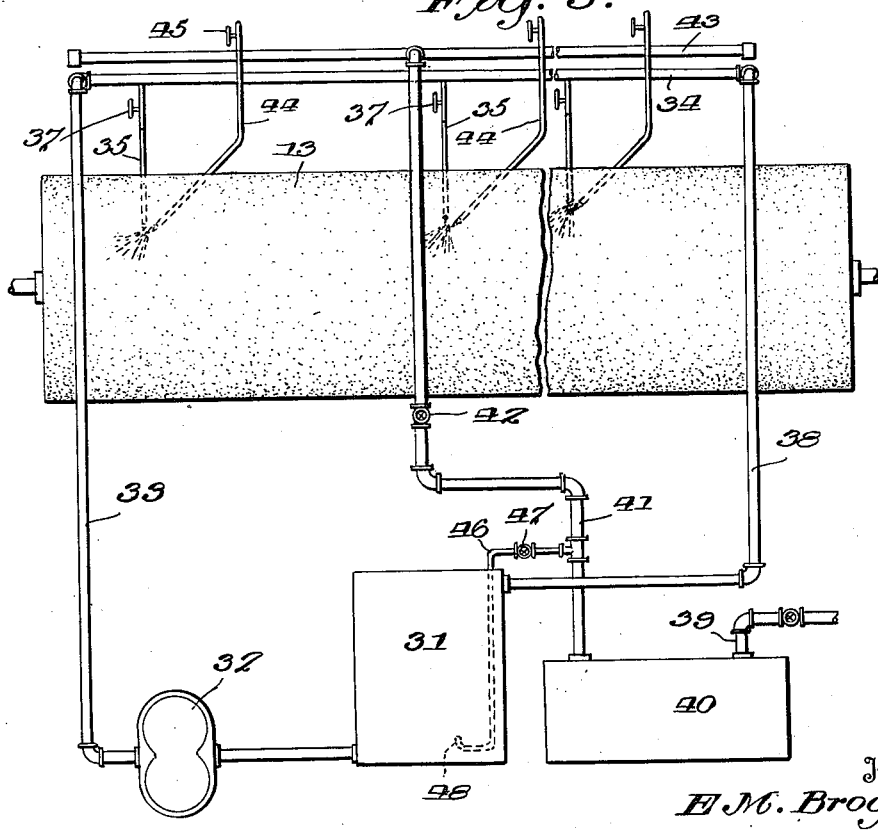

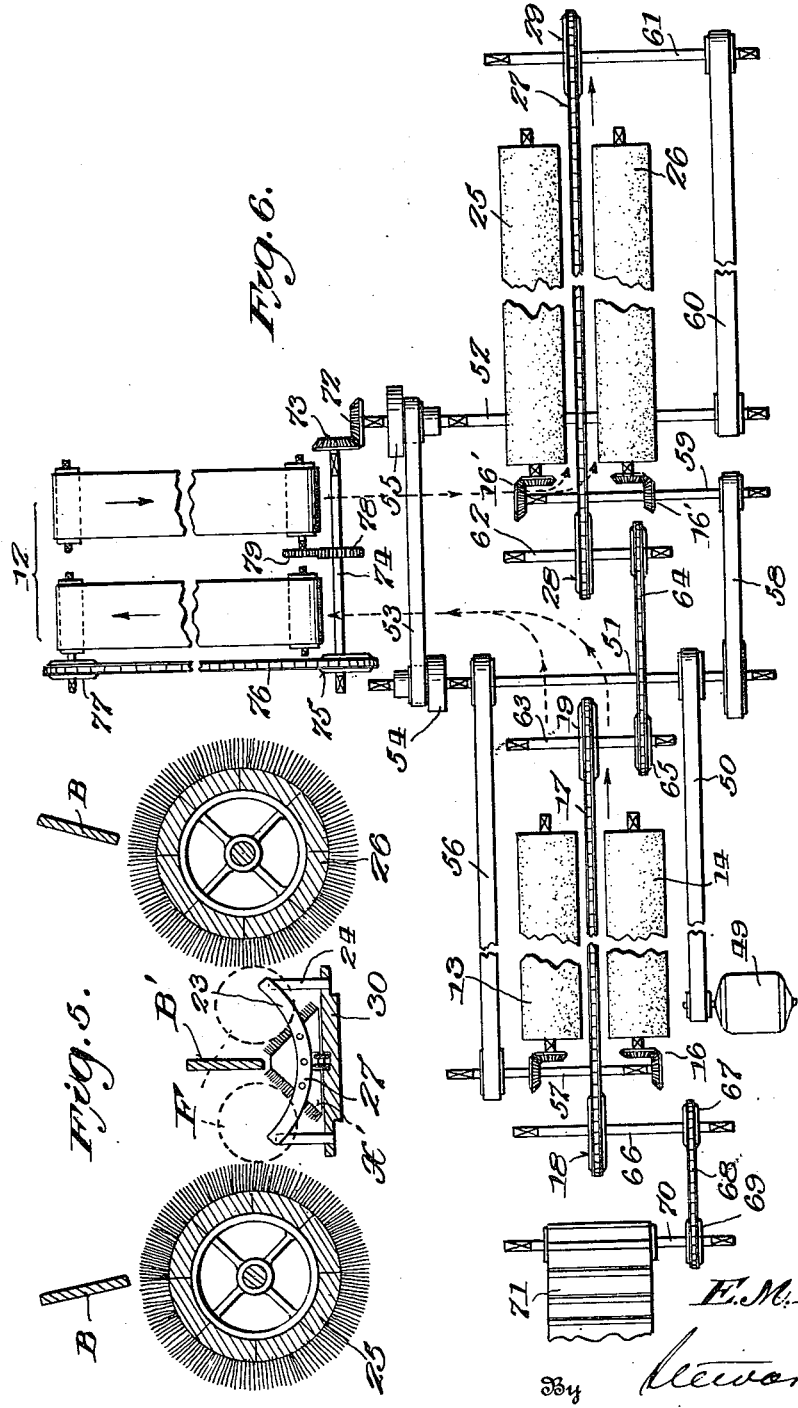

Patented May 29, 1928.

UNITED STATES PATENT OFFICE.

1,671,924

ERNEST M. BROGDEN, OF SANTA MONICA, CALIFORNIA, ASSIGNOR TO BROGDEX COMPANY, OF WINTER HAVEN, FLORIDA, A CORPORATION OF FLORIDA.

ART OF HANDLING FRESH FRUITS.

Application filed July 23, 1923. Serial No. 653,227.

This invention relates to art of handling fresh fruits; and it relates more particularly to the art of treating fresh fruit preparatory to marketing the same, the term "fruit" being herein employed in a broad sense to include not only fruit proper but also such vegetables as can advantageously be handled in a similar or analogous manner.

The invention comprises processes of and apparatus for treating fruit as will be hereinafter disclosed. While the apparatus to be hereinafter described is particularly useful in carrying out the process of the invention, its use is not necessarily restricted thereto.

The invention has to do especially with the handling of fruit in such manner as to cleanse the same of undesirable foreign matter adhering thereto and to provide the fruit with a film-like protective coating of such character as to enhance its keeping qualities and thus facilitate its transportation to and sale in distant markets.

The treatment of fresh fruit in the manner outlined generally above forms the subject-matter of a number of prior co-pending applications of this applicant, the present invention being in the nature of further developments and refinements which are directed more particularly to perfecting and in some respects simplifying the handling of fruit in accordance with the general principles laid down in the prior applications aforesaid. One of the principal objects of the present invention is to reduce the degree of personal skill required in the handling of fruit according to the aforesaid general principles and thus make possible the attainment of still more uniform and satisfactory results in commercial practice. Another object of the invention is to provide apparatus capable of increased flexibility of operation as regards adaptability to the treatment of separate lots of fruit differing in degree of dirtiness as received from the growers. Still another object is to provide a method of applying treating material to the fruit, in an even more effective and satisfactory manner than has been employed heretofore. A further and more specific object of the invention is to provide for application of the treating material to the fruit in one stage, and final treatment of the fruit in a later stage, under conditions such that the operation to be effected in the separate stages can be carried out to better advantage than has been possible heretofore, especially as regards the completeness with which dirt and other foreign matter is removed from the surface of the fruit, and also as regards the uniformity, extreme thinness and other desirable characteristics of the protective film-coating with which the fruit is provided. Further objects of the invention are to perfect in various respects numerous details of both process and apparatus, and generally to improve the technique of the handling of fruit in this general manner on a commercial scale.

With the foregoing objects in view, as well as others which will become apparent as the disclosure proceeds, the invention consists in the novel combinations and features of process and apparatus which will first be described and explained in connection with certain illustrative embodiments of the broad principles involved and will then be more particularly pointed out in the claims.

Described generally, the process of the invention involves the application to fresh fruit of a fluid treating material, which may advantageously take the form of a relatively thin emulsion-like liquid for the purpose of cleansing, or more usually both cleansing and protecting, said fruit; the operation as a whole being best separated into two more or less distinct stages between which is usually interposed a suitable interval of time for the purpose of rendering the first stage of the treatment more completely effective. The first stage of the treatment consists more particularly in applying the treating fluid to the fruit in such manner as to ensure intimate contact of the treating liquid with all parts of the fruit surface, and also to ensure that the entire surface of the fruit is thoroughly, but not too roughly, rubbed to loosen or remove such adhering foreign matter as is readily susceptible of removal in this manner. Concomitantly, the fruit may receive in this stage an application of protective material that will eventually constitute a relatively permanent protective or preservative film coating, which material may or may not form a constituent of the cleansing composition initially applied to the fruit, although in the illustrative embodiment of the invention hereinafter to be described, the composition applied to the fruit is of such character as both to act as a cleansing agent and also to provide the material for the final protective film coating left upon the fruit as a result of the complete treating process.

In the second of the two main stages into which the process of the invention may be considered as divided, the fruit, having received a thorough application of the treating composition, is subjected to a smoothing and polishing treatment effective to remove residual dirt or other foreign matter from its surface and also any excess of treating material, with the result that at the end of this stage the fruit is thoroughly cleansed and is also provided with a very thin film coating of protective or preservative material of the character hereabove generally set forth, this coating being continuous and substantially uniform all over the surface of the fruit but practically invisible and not noticeable except upon careful examination.

The interposed interval of time above referred to between the two main steps of the process is usually to be recommended in actual practice. It serves to permit a solvent or loosening action of the applied treating composition upon certain foreign matter which often adheres to the surfaces of fruit, such as scale, smudge, or the like; so that the subsequent rubbing and polishing operation comprised in the second main stage of the process is more effective than it otherwise would be in removing the last traces of adherent dirt, etc.

According to the present invention, the first stage of the process is most desirably carried out with the aid of rubbing or brushing surfaces moving in contact with the fruit at a relatively low rate of speed, the object being to ensure thorough and uniform rubbing of all portions of the fruit surface with the treating composition rather than to accomplish a finishing operation in the sense of a final adjustment of the thickness of the protective coating. In the later stage of treatment where the final rubbing or polishing occurs, the rubbing or polishing surfaces are desirably caused to move in contact with the fruit at a very materially higher rate of speed, usually at least twice as fast, in order that not only may the residual foreign matter be thrown off, so to speak, by the combined rubbing action and resultant spinning of the fruit, but also that the film coating finally left upon the fruit may be of the extremely thin uniform character that actual practice has shown is essential to attainment of best results in handling fruit in this manner. It may be pointed out here that although a complete and continuous coating of the fruit with preservative material is necessary in order to prevent shrinkage and withering of the fruit and to preclude access thereto of contaminating and harmful agents, such as blue mold spores and other micro-organisms causing rot and decay, nevertheless the application of more than a very thin film coating may often be of far greater injury than benefit to the fruit. This is because there apparently must be a certain diffusion of gases through the skin of the fruit, sometimes termed the breathing of the fruit, in order that the fruit may not deteriorate in quality. Therefore the necessity for so adjusting the protective film as not to prevent this breathing or transpiration, while at the same time protecting the fruit against shrinking and withering and access of harmful organisms, demands nice adjustment of operating conditions.

A particularly advantageous feature of the invention consists of mechanism whereby the advance or progress of the fruit through the entire apparatus system may be effectively and simply controlled in such manner that, according as the fruit is very dirty or comparatively clean as received from the grower, it can be subjected at the will of the operator to a relatively prolonged treatment or to a relatively short treatment, all without requiring any alteration in the size or extent of the apparatus employed. This makes for great flexibility of operation in conformity with the constantly varying conditions of packing house practice; and only slight skill on the part of the operator is necessary to attain uniform and dependable results even where the fruit varies widely at different times in quality and surface characteristics.

Another feature of great practical importance is the manner of bringing the treating material into contact with the fruit. Heretofore this has been done in various ways that have been reasonably effective: but it has now been found that the treating composition, especially when it comprises paraffin associated with a liquid vehicle or solvent therefor, can in most instances be effectively and satisfactorily applied to the fruit by devices of the air-brush type; and that where the composition contains paraffin as described, it is desirable to avoid maintaining the mixture under more than a very slight plus pressure, it being particularly advantageous to maintain it even under some degree of vacuum. This is because of the tendency of paraffin to congeal and separate out of even fairly dilute solutions when under substantial pressure, thus making it a very difficult matter to force paraffin-containing liquid compositions through the small orifices characterizing ordinary spray devices, because the paraffin tends to separate and clog the same. The present applicant has discovered that this difficulty can be avoided if the pressure on the composition be kept low or even negative; and has found that these conditions can be maintained, and at the same time a very fine mist or fog of the composition produced, by air-brush means acting to draw the composition from the source of supply through the atomizing orifice rather than by forcing it therethrough under substantial positive pressure. Furthermore the employment of air-brush devices makes it possible to so control the shape or configuration of the issuing jet as to increase the accuracy and uniformity with which the treating material can be applied to the fruit, a fact which is of importance in reducing waste and securing rapid and thorough distribution of the material all over the surface of the fruit.

The apparatus of the present invention also is especially well adapted to attain rotary or turning movements of the fruit about a constantly changing axis, which is highly desirable in order that all portions of the surface may be thoroughly rubbed or scoured by the moving rubbing surfaces. In the best embodiment of the present apparatus, this is effected by means of flexible projections or abutments extending into the path of travel of the fruit through the apparatus, these projections serving to arrest the fruit temporarily and to compel a change in the axis of rotation. Most desirably, members in the nature of pushers are also provided to cooperate with the aforesaid retarding projections or abutments by gently forcing the fruit against and over said projections, thus enhancing the turning movements induced by said projections.

In order to afford a fuller understanding of the nature of the invention, a practical embodiment of the process, and of apparatus that may desirably be employed in carrying it out will now be described in detail, it being understood however that the description of these specific embodiments of the invention is merely illustrative and is not restrictive.

Referring to the accompanying drawings which illustrate more or less diagrammatically a desirable practical form of apparatus that may be employed in carrying the invention into effect, Figure 1 is a view, mainly in side elevation, with certain parts removed to disclose structure behind them and with other parts in section, showing the general arrangement of the apparatus system;

Fig. 2 is a plan view of said system, with certain parts removed for the sake of clearness;

Fig. 3 is an enlarged view, in side elevation, showing details of the means for supplying and circulating fluid treating material;

Fig. 4 is a transverse vertical section, on an enlarged scale, through the composition-applying unit of the system;

Fig. 5 is a similar transverse section through the finishing unit; and

Fig. 6 is a schematic layout of the driving gearing and connections of the various parts of the system.

The apparatus here illustrated may be generally described as comprising principally two rubbing or brushing units, indicated generally at 10 and 11, and operatively associated in series to treat fruit in successive stages, unit 10 being adapted to apply a liquid or fluent treating material to fruit and to rub the same thoroughly thereover, while unit 11 completes the treatment. At 12 is indicated generally conveyor means interposed between units 10 and 11 and arranged to deliver fruit from the first to the second unit after a predetermined delay.

The units 10 and 11 may be similar in general construction, differing only in certain respects as will hereinafter appear. Referring more particularly to unit 10, this unit comprises two cylindrical brush rolls 13 and 14 which are spaced apart as shown and are suitably journaled at their ends in supporting frame-work 15 for rotation about their longitudinal axes, the rolls being suitably driven in opposite directions as by means of bevel gearing indicated generally at 16. As here illustrated, the brush rolls are horizontally disposed, but they may be inclined slightly either toward the receiving end (at the left in Figs. 1 and 2) or toward the delivery end (at the right). As will appear more fully hereinafter, it is most advantageous either to have the rolls horizontal as shown or slightly inclined upwardly toward the delivery end. Disposed in the space between the brush rolls 13 and 14, is an endless brush and conveyor mechanism adapted, during its upper run or pass, to travel longitudinally of and between the brush rolls 13 and 14 and to cooperate therewith in properly rubbing the fruit while at the same time advancing it toward the delivery end of the unit. This endless brush and conveyor mechanism comprises an endless chain 17 running over sprockets 18 and 19, and carrying brush blocks indicated generally at 20, which blocks are individually secured to the conveyor chain in any suitable manner. As best shown in Fig. 4, said blocks 20 are of generally triangular or inverted V-shaped cross section and each is secured to the conveyor chain 17 on one side or base, the other two sides or inclined lateral faces being provided with a surfacing of brush bristles as indicated at 21, and these brush bristles, as well as those of the brush rolls 13 and 14, being most desirably fairly soft and flexible. Horsehair is ideal material and is recommended for the purpose. In its upper run, the endless chain brush mechanism slides upon a stationary supporting strip or board 22 which is centrally grooved to receive and guide the conveyor chain 17 to which the brush blocks 20 are secured, each of said brush blocks being similarly grooved or recessed on the side fastened to said chain, as shown. It is apparent that the upper run of the endless brush and conveyor mechanism cooperates with the aforesaid cylindrical brush rolls 13 and 14 to provide two trough-shaped runways for fruit, such fruit being indicated at F. The arrangement of the parts is such that fruit cannot fall down through the machine, but is supported in proper position by the cooperating brushing surfaces, as shown. The endless brush-block mechanism is driven through the sprocket 19 in such manner that the upper pass travels toward the discharge end of the machine as indicated by the arrow in Fig. 2. As will hereinafter appear more fully, the speed at which the endless brush-block mechanism advances may be varied independently of the rotary brush-roll speed. In order to advance the fruit positively toward the discharge end of the machine, the endless brush-block mechanism is provided at suitable intervals with pushers 23, each of which may be secured to one end of a brush-block 20 in the space between it and the next block in the series, said pusher projecting into the fruit runways from the opposite inclined faces of the block. These pushers are adapted to engage the fruit as the brush-block mechanism advances, thus positively feeding the fruit through the machine. This forward feeding movement may also be induced to some extent by spirally grooving the brush-rolls 13 and 14, if desired. These pushers are not so necessary when the brush-rolls are inclined forwardly toward the delivery or discharge end of the apparatus.

If desired, division boards B may be mounted, one above each brush-roll, to extend longitudinally of the same; while a similar division board B' extends longitudinally above the brush-block mechanism. These division boards serve to prevent fruit from jumping out of the respective runways as it may tend to do in exceptional instances. It is to be understood that the apparatus may have but one runway, instead of a plurality as here shown.

In order to favor more or less gentle tumbling and irregular movements of the fruit upon varying axes as it goes through the machine, and thus to enhance the thoroughness and uniformity of the rubbing and brushing effect obtainable, upright members 24 may be mounted in the stationary supporting strip or board 22 in such manner as to project upwardly into the path of fruit advancing along said runways. Said members 24 may be supported for adjustment vertically, as by mounting them frictionally in holes in the board 22. These members 24, especially if long enough to project into the path of the pushers 23, should be made of flexible material such as rubber hose so as to yield to comparatively light pressure and thus also to avoid injuring the fruit.

Up to this point, the description of unit 10 applies equally well to unit 11, the horizontal rotary brush-rolls of the latter being indicated at 25, 26, and the endless brush-block mechanism being indicated generally at 27, said mechanism being carried by sprockets 28 and 29. Suitable receptacles, such as pans P and P', may be placed under units 10 and 11 to catch material falling from the brushes.

While the detailed construction and arrangement of the endless brush-block mechanism of units 10 and 11 may be identical, it is desirable, because of the different rates of speed at which the brush-rolls are driven in units 10 and 11, respectively, to modify said construction and arrangement in certain respects to obtain the best results in each unit. In general, the arrangement of the endless brush-block mechanism in unit 10, where the speed of brush-roll rotation is relatively low, should be such that the fruit passing through this unit is carried somewhat higher with respect to the brush-roll centers, in such manner as to bear with somewhat more of its weight against said brush-rolls, than is the case in the higher speed unit 11. Accordingly in unit 10, the brush-blocks are desirably of such cross section that their brush faces are steeper or more sharply inclined from the horizontal than are the brush blocks in unit 11. For example, the base angles X of the brush-blocks in unit 10, as best shown in Fig. 3, may be about 65° in a typical example; while the corresponding angles X' of the brush blocks of unit 11 may be 45° to 50°. Furthermore, the supporting strip or board 30 of unit 11, which corresponds to the strip 22 of unit 10, may desirably be a couple of inches or so lower than said strip 22.

The unit 10 is provided with an air-brush system for applying liquid or fluent treating material to fruit passing through the fruit runways of said unit. In the present example this treating material is assumed to be an emulsion-like composition comprising paraffin and an oily vehicle, together with water, all as will be more fully hereinafter set forth. In applying such a composition to fruit, it is important that the application be made as uniformly as possible and that the composition itself be maintained uniform in character. To this end it is desirable that the composition be constantly agitated to prevent separation occurring to a greater or less extent. The system herein disclosed is well adapted to answer the foregoing requirements and is especially to be recommended, but it is not to be inferred that the invention is restricted to the employment of this specific means for applying treating material to the fruit. Referring to the system shown in the drawings, a supply of fluent treating material is contained in a suitable receptacle 31 from which it is drawn by pump 32 and sent under as low pressure as possible through supply pipe 33 to header 34, which header extends longitudinally above the brush rolls and endless brush block mechanism of the unit. From this header 34, lateral branches 35 extend oppositely in pairs over the fruit runways, each branch terminating in a small-orificed nozzle 36. The feed of treating material from the header 34 to said branches 35 is suitably controlled and regulated by valves 37. As many pairs of these branches 35 may be provided as is necessary or desirable. Return-flow pipe 38 returns from header 34 to receptacle 31 the surplus treating material not discharged through the lateral nozzle pipes 35. The pump 32 may be operated continuously, thus maintaining constant circulation and agitation of the treating material through pipes 33, 34 and 38, and the supply receptacle 31, while the desired limited quantities of said material are withdrawn from the supply circuit through the lateral nozzle pipes 35. Compressed air for operating the air-brushes is supplied from a compressor (not shown) through valved supply pipe 39 to compressed air tank 40, from which latter it is led through pipe 41 and reducing valve 42 to the compressed air line 43 adjacent to the header 34. Branch pipes 44 extend oppositely in pairs from the air line 43, and the supply of compressed air for each pair is regulated and controlled by a valve 45. Each branch 44 terminates in a fine-orificed jet discharging operatively adjacent each liquid nozzle 36 in such manner as to draw the treating material therefrom and atomize it to give a spray directed downwardly upon the fruit in the fruit runways immediately below. By employing known or suitable types of nozzles and jets, the spray may be either the ordinary conical spray here shown, or it may be flattened or fan-shaped. Electric heating coils 36ᵃ and 44ᵃ, wound upon the liquid and air nozzles, respectively, and energized by any suitable source of current, may advantageously be employed to heat the liquid treating material and the air just as they leave their respective nozzles. This renders the coating material still easier to spread upon the fruit in an exceedingly thin film.

From air supply pipe 41 leads a branch pipe 46, valved at 47, this pipe extending into the lower part of supply reservoir 31 and terminating in a discharge outlet 48 therein. This enables a controllable amount of air under pressure to be continuously admitted into the supply of treating material in 31 in order to assist in maintaining the treating material in a state of agitation. If desired the unit 10 may be enclosed within a housing (not shown) to prevent escape of the sprayed or atomized material into the surrounding atmosphere.

The conveyor unit 12 interposed between the rubbing or brushing units 10 and 11 may take any appropriate form adapted to effect delivery of fruit from unit 10 to unit 11 after a predetermined delay. In this instance said conveyor is of the belt type, which is satisfactory in practice and of which the construction is well-known.

As before stated, an important feature of the invention is the arrangement whereby the brush-rolls of the unit 11 are driven at a substantially higher rate of speed than those of the unit 10, and whereby the speed of the conveying mechanism as a whole, including the endless brush-block mechanism of both units, as well as the conveyor means 12 interposed between said units, can be varied independently of the rotary speed of the brush-rolls. An arrangement by which this can be effected is illustrated in Fig. 6 which is to be understood as largely schematic in character, showing merely the driving and driven relation of the essential parts without attempting to indicate precisely their exact forms or relative positions. Referring to Fig. 6, the motor 49 supplies power through belt 50 to main power shaft 51 for operating the apparatus system as a whole. Shaft 51, in turn, drives the variable speed counter-shaft 52 through a belt 53 which can be shifted upon the cooperating stepped cone pulleys 54 and 55 to vary the speed of said countershaft as desired. From the main power shaft 51 the rotary cylindrical brush-rolls of the units 10 and 11 are driven at constant but differing speeds. Through belt 56 is driven the shaft 57 which in turn transmits power for rotating the brush-rolls 13 and 14 of unit 10 through the aforesaid bevel gear mechanism 16. Similarly power is transmitted through belt 58 to shaft 59 which carries the bevel gear 16′ to drive the rotary brush-rolls 25 and 26 of unit 11; but in this case the driving ratio is substantially higher. In practice the brush-rolls 13 and 14 may be driven at say 100 or 125 to 150 R. P. M., for example; while the brush-rolls 25 and 26 may be driven at 300 or 400 to 600 or 700 R. P. M. These figures are of course to be understood as merely typical of good practice and as only generally indicative of the relation between the rotative speeds of the cylindrical brush-rolls of the units 10 and 11, respectively, the principal consideration being that the brush-rolls of the high speed unit shall rotate substantially faster than those of unit 10. Thus, in some cases, a speed of 175 to 200 R. P. M. for the brush-rolls 25, 26 will suffice. This is so especially when the treating composition is relatively thin, containing not more than 15 per cent of paraffin, which is often desirable.

The variable speed counter-shaft 52 transmits power to drive all the conveyor parts of the system. Through belt 60 it drives the shaft 61 carrying the aforesaid sprocket 29, which latter, through brush-block chain 27 drives sprocket 28 and its supporting shaft 62. Shaft 62 in turn drives shaft 63 and sprocket 19 through chain 64 and sprocket 65. Sprocket 19 drives sprocket 18 and its supporting shaft 66 through brush-block chain 17; while sprocket 67 and shaft 66 driving through chain 68, sprocket 69 and shaft 70, actuates the fruit elevator 71 by which fruit is fed to unit 10. Shaft 52 also drives the outgoing run of conveyor drive 12 through bevel gears 72, 73, shaft 74, sprocket 75, chain 76 and sprocket 77; while it also drives the incoming run of said conveyor device in the opposite direction through spur pinions 78 and 79.

It is apparent therefore that by shifting the belt 53 on the stepped cone pulleys 54 and 55, all the parts of the apparatus system that convey or advance the fruit positively through the apparatus system can be made to run faster or slower without affecting the rotative speed of the brush-rolls of either unit.

At 80 is conventionally indicated a drier or solvent evaporator into which fruit is discharged from unit 11 and in which at least a part of the solvent vehicle and moisture (if a composition containing water is used) is removed with the aid of heat and air currents. The temperature employed in the drier may be 130°–140° F. in a typical instance. Various types of driers are suitable and commercially available for the purpose. For attainment of best results, an efficient drier is in most cases highly desirable to complete the treatment of the fruit, and its use in sequence with the rubbing apparatus constitutes an important feature of the invention in its most desirable practical embodiments.

In employing the described apparatus to carry out the process of the invention, the fruit to be treated is fed into the runways of the first unit 10 by the elevator 71. The fruit may or may not have been subjected previously to a cleansing treatment of some kind, but in the present illustrative example it will be assumed that it has not and that it goes into unit 10 just as it is received at the packing house from the grove. Immediately upon entering the runways of unit 10, the fruit encounters a spray or atomizing jet of the treating fluid projected upon it by the air brush mechanism before described, the jets from the air brush device being most desirably directed down upon the entering fruit from a height of say four inches or so above the fruit and at an angle of 45° or thereabouts to meet the advancing fruit, thus increasing the effective length or sweep of the spray. Simultaneously the fruit is subjected to the rubbing action of one of the rotary cylindrical brushes on the one hand and of the rectilinearly advancing brush-blocks 20 on the other. The rotation of the brush-roll tends to cause the fruit also to turn or spin, but this spinning is retarded and largely checked by the conveyor brushes 20 which have a braking action on the fruit and materially slow up its rotation. This enhances the effectiveness of the brushing action which obviously becomes greater as the fruit approaches a stationary condition. The forward movement of the brush-blocks also tends to vary the axis upon which the fruit rotates, and this effect is still further enhanced by the cooperation of the pushers 23 and the stationary flexible turning or abutment members 24; so that as the fruit is advanced through the runways it turns on many different axes and is thoroughly rubbed over its entire surface including the stem end which often escapes rubbing altogether in prior apparatus as commonly designed. If the brush-rolls are inclined slightly upward toward the delivery end, the rubbing and scrubbing action upon the fruit is still further enhanced. The relatively soft horsehair brushing surfaces, most desirably employed in both units, permit vigorous rubbing of the fruit without injury thereto.

As the fruit travels toward the discharge end of unit 10 it encounters a spray jet of treating fluid from each of the series of air brushes above the particular runway through which the fruit is moving and the treating material is thus spread all over the fruit quickly and uniformly. In the present instance the treating material is assumed to be an emulsion-like mixture comprising principally paraffin wax, an oily vehicle and water, blended in such manner as to provide a milky composition that is freely fluent and easily atomized by the air brush devices. The air jets 44 act substantially like suction ejectors to draw the composition out of the nozzles 36; and by thus avoiding the use of substantial pressure upon the fluid material, clogging of the fine-orificed nozzles 36 by solidified paraffin is avoided, and continuous operation for long periods of time without interruption is thus made possible. In a typical instance, the treating emulsion or composition may comprise 7.5 per cent of paraffin wax, 6 per cent cocoanut oil, 25 per cent of a highly refined petroleum distillate of the kerosene type, 1 per cent of borax, and the remainder water. A composition of this character has special advantages. Its content of solvent oil renders it highly effective in dissolving or loosening scale, oily smoke or smudge, and other adherent foreign matter that can be removed only with the greatest difficulty, or not at all, by the use of water, soapsuds, etc. On the other hand, the content of water renders this composition effective for removal of the so-called "honey-dew" which is often found on citrus fruit, especially in California, and which requires water for its dissolving and removal. This type of treating composition therefore provides both the aqueous and non-aqueous constituents necessary to effect complete cleansing, and it is very effective for this purpose. The paraffin content not only functions to some extent as a non-aqueous cleansing agent, but a very thin and continuous film coating thereof is also left upon the fruit when the treating operation has been completed and acts to preserve and protect the fruit as hereinabove pointed out. A suitable solvent oil of the type mentioned above may have, for example, a specific gravity of 0.810, flash point about 149° F., and boiling range of 360° to 486° F. The borax forms a soap to some extent with the cocoanut oil, which aids in emulsifying, aside from the protective effect of the cocoanut oil itself in the final film coating obtained on the fruit.

Another desirable formula for the treating composition is one volume of paraffin to two volumes of a colorless tasteless and odorless mineral oil of the type known as white mineral oil but of fairly low viscosity. One good oil of this type is of 0.840 specific gravity, has a viscosity of 70–73 seconds at 100° F., flash point 340°–350° F., and a boiling range of 600° to 745° F., it being understood that these figures are merely typical and approximate.

It will be noted that the flash points of both the refined light mineral oils just mentioned by way of example are well above the operating temperatures at which they are employed in the novel process. In other words, they are relatively non-volatile. This is of special advantage in atomizing mixtures of said oils with waxy material in the manner herein described for the reason, among others, that congelation of fine particles of the paraffin or other waxy material prior to actual contact of the mixture with the fruit does not occur with anything like the facility that it would if a solvent were employed that is volatile properly speaking. Moreover, employment of solvents of the character herein recommended involves a much lower fire risk.

After having had the combined cleansing and preservative compostion thoroughly rubbed all over its surface in unit 10, and having been cleansed meanwhile to a substantial extent, the fruit is automatically delivered from the fruit runways to the conveyor system 12, the fruit resting quietly as it is carried by the conveyor belts on its way to unit 11. This interval gives the treating material ample time to continue its solvent and loosening effect upon any stubbornly adherent foreign matter that may still remain on the surface of the fruit; so that by the time the fruit reaches unit 11 any remaining adherent foreign matter is ordinarily so loosened that the subsequent high speed rubbing in unit 11 dislodges and removes it easily.

Upon leaving conveyor 12 and entering the runways of unit 11, the fruit immediately comes in contact with the brushing surfaces of the rotary brush rolls which are driven at a materially higher rate of speed than are the brush rolls of unit 10. As already indicated, from 175 to 700 R. P. M. is a practical speed range within which the rolls of unit 11 may be operated in typical instances, from 350 to 500 R. P. M. being a good working average. The endless brush conveyor 27, however, may, and usually does, operate at the same linear speed as does the corresponding mechanism in unit 10, and it therefore advances the fruit through unit 11 at the same rate. The gentler slope of the brushing surfaces of the brush-blocks, and the lower setting of the blocks with respect to the brush-roll axes as the series of blocks pass between said brush-rolls, are such that more of the weight of the fruit rests upon the brush-blocks than it did when passing through unit 10. This causes the brush blocks of unit 11 to exercise a greater braking effect upon the spinning of the fruit than did the brush-blocks in unit 10; so that, notwithstanding the much higher rotative speed of the brush-rolls in unit 11, the fruit, although spinning or turning over somewhat faster than it did in unit 10, does not spin proportionately faster. This is advantageous because it is desirable to realize to a very large extent the thorough thinning-out or brushing-out action of the high speed brush rolls of unit 11 in obtaining an extremely thin film coating of the preservative material on the fruit as a final result of the treatment. This object could not be effectively attained if the fruit were allowed to spin too rapidly as a result of its frictional contact with the high speed brush rolls.

In a typical instance, the brush-rolls of the units 10 and 11 may be 10 feet long, with an over-all diameter of 10 inches, the relatively soft horsehair bristles being 1½ inches long and mounted on a 7-inch core. These dimensions are to be understood as generally indicative of good practice and not as restrictive. The time required for fruit to pass through the two rubbing units and the intervening conveyor unit is positively controlled by the endless brush-block conveyors operating in conjunction with the flexible retarders 24, and depends upon how dirty the fruit is. Where the fruit is very dirty, the conveyor mechanism is driven so that fruit goes through unit 10 in about 30 seconds, remains about one minute on the belt conveyor unit 12, and takes another 30 seconds to go through the high speed rubbing unit 11. Where the fruit is of only average dirtiness, these times may be cut in half. If the fruit as it comes from the groves runs exceptionally clean, it is unnecessary to let it ride around on the belt conveyor 12, and it may therefore be chuted directly from the low speed wet-brush unit 10 to the high speed unit 11, thus cutting out the intermeidate conveyor 12 altogether.

The subsequent passage of the treated fruit through the drier or solvent evaporator is advantageous in that, if a reasonably volatile solvent is used, a substantial proportion thereof may be evaporated off at this stage; and even where the solvent is of low volatility the character of the coating film is also found to be improved by passing the fruit through the drier.

The action of the high-speed brush rolls and the cooperating brush-blocks of unit 11 is so effective that as a rule the fruit is substantially clean and is also practically free of all surplus coating material by the time it has traveled one-quarter or less of the length of the brush rolls. The treatment received by the fruit during the remainder of its travel through unit 11 is in effect mainly a finishing and smoothing treatment in which the vigorous rubbing and burnishing action of the soft brushing surfaces not only renders the surface of the fruit relatively dry but also thins out the small amount of treating material remaining on the fruit into a coating film which is extremely tenuous but which is nevertheless continuous over the entire surface of the fruit, thus providing a uniform enclosing envelope which effectively protects the fruit against exterior infection and prevents shrinking or withering for relatively long periods of time, but which nevertheless does not plug the stem-end or otherwise so completely seal the fruit as to prevent breathing or transpiration. The attainment of an exceedingly thin film of waxy protective material, such as is herein described, is a highly important feature of the invention and marks a distinct advance in the art. An idea of the thinness of the protective waxy film obtained, when the invention is carried out in its most advantageous form, can be gained from the fact that in practice as little as one gallon of paraffin (measured in the liquid state) often serves to coat a whole carload of fruit. In the case of citrus fruit under present practice, this means about one gallon (or, say, about 120 ounces) of paraffin to coat 10,000 square feet of fruit surface. A film coating of this character is therefore approximately one-fiftieth as thick as an ordinary coat of paint. Since an average carload of citrus fruit is about 29,000 pounds net, this proportion of one gallon of paraffin per 10,000 square feet is equivalent to less than half an ounce per 100 pounds of average citrus fruit; and while citrus fruit is specifically referred to by way of example, it is of course to be understood that a film of similar characteristics can be applied to apples, pears, etc., by the process of the invention. In practice, it is advisable not to exceed one ounce of paraffin per 100 pounds of citrus fruit; and as little as one-quarter to one-half an ounce is distinctly better. Otherwise stated, it is advisable ordinarily not to use more than about 18 to 20 pounds of paraffin (or other sealing material) per each 10,000 square feet of fruit to be treated, and from 5 to 10 pounds per each 10,000 square feet usually gives distinctly superior results especially where the solvent in the mixture applied to the fruit is of relatively low volatility.

A very thin film of the character herein contemplated can be obtained on the fruit much more easily when the paraffin is accompanied by a relatively large volume of solvent or liquid vehicle and hence, for the attainment of best results, it is found best to use at least 1½ volumes of solvent for each volume of paraffin, and larger proportions of solvent up to as high as 80 to 90 per cent of the mixture are often found highly advantageous in practice. In fact, mixtures in which the waxy substance employed comprises from about 5 to not substantially more than 20 per cent are especially to be recommended. The application to fruit in unit 10 of a relatively thin treating mixture of this kind, such for example as that in the specific example hereinbefore given, followed by the high speed brushing and rubbing in the second rubbing unit (unit 11) and the passage through the drier or solvent evaporator, enables attainment of uniformly satisfactory results, fruit thus treated having remarkably long keeping qualities while at the same time it retains its fine flavor and is of excellent appearance.

While reference has been made more particularly to paraffin as a typical protective and preservative agent, it is believed that the treatment of fruit with any material, whether waxy or oily, capable of giving a relatively permanent protective coating, in such manner that an extremely thin coating of the character described results, is broadly novel in the art. Without limitation to the specific process and apparatus hereinabove described by way of illustrative examples, it is believed to be broadly novel with this applicant to subject fruit carrying a fluent or spreadable protective material to continuous systematic rubbing or brushing for a period of 5 seconds or longer, and particularly for a period of 10 to 30 seconds, whereby an extremely thin protective film coating of the character described is obtained on the fruit; also to subject fruit carrying such protective material to the rubbing action of a surface moving at a speed equivalent to the surface speed of a 10-inch brush-roll driven at 175 to 700 R. P. M. Such modes of operation have led to entirely new results of the utmost utility and importance in the fruit-handling industry. Moreover, fruit provided with a protective film-coating of the extreme degree of thinness resulting from the practice of the novel process in its best embodiments, is a novel article of food.

What is claimed is:

1. Apparatus for treating fruit comprising the combination, with rubbing means and means cooperating therewith to apply treating material to fruit, of further rubbing means and means arranged to deliver fruit thereto after treatment by the first-mentioned rubbing means, and driving means adapted and arranged to drive such further rubbing means at a higher rate of speed than the first mentioned rubbing means.

2. Apparatus for treating fruit comprising the combination, with a brush-roll machine comprising parallel rotary brush rolls cooperating to provide a fruit runway, of means cooperating therewith to apply treating material to fruit, a second brush-roll machine, means delivering fruit to said second machine after treatment by the first, and driving means arranged to rotate the brush rolls of both machines but to rotate those of the second at a higher rate of speed than the first.

3. The process of treating fresh fruit which comprises directing an atomized mixture comprising waxy material and a solvent thereof into contact with the fruit, rubbing the fruit to distribute said mixture uniformly thereover in a thin protective film, and removing at least part of said solvent from said film by an evaporating treatment.

4. The process of treating fresh fruit which comprises directing an atomized mixture comprising paraffin and a solvent thereof into contact with the fruit, rubbing the fruit to distribute said mixture uniformly thereover in a thin protective film, and evaporating at least part of said solvent from said film.

5. The process of treating fresh fruit which comprises rubbing fruit with a protective composition comprising a waxy substance, such as paraffin, and a solvent thereof, to provide the fruit with a thin film-like protective coating, and removing at least part of said solvent from said film by an evaporating treatment.

6. The process of treating fresh fruit which comprises directing an atomized mixture comprising paraffin and a refined light mineral oil having a flash point at least as high as that of kerosene into contact with the fruit, and then spreading said mixture uniformly over the fruit in a thin protective film.

7. The process of protectively treating fresh fruit which comprises applying thereto and spreading uniformly thereover a coating material in fluent condition capable of forming a relatively permanent substantially continuous film-like adherent protective envelope for the fruit, the spreading being so conducted as to remove surplus material to such an extent as may be necessary to limit the amount of said material in such envelope to a maximum of not substantially more than 20 pounds of said material per each 10,000 square feet of fruit surface treated.

8. The process of protectively treating fresh fruit which comprises applying paraffin in fluent condition to fruit and thoroughly rubbing the fruit to provide it with a substantially continuous protective film coating, the rubbing being so conducted as to remove surplus material and ensure said coating containing not more than about 5 to 10 pounds of paraffin per each 10,000 square feet of fruit surface treated.

9. The process set forth in claim 8, further characterized by the fact that the paraffin is mixed with a solvent vehicle.

10. The process of protectively treating fresh fruit which comprises applying to fruit a substance capable of forming a relatively permanent substantially continuous protective film-coating on the fruit, said substance being mixed with a solvent vehicle, rubbing said fruit to remove any surplus of the coating mixture and until the fruit is provided with an exceedingly thin film coating containing not more than about 20 pounds of said substance per each 10,000 square feet of fruit surface treated.

11. The process of protectively treating fresh fruit which comprises applying to fruit paraffin mixed with a solvent vehicle, rubbing said fruit to remove any surplus of the coating mixture and until the fruit is provided with an exceedingly thin substantially continuous film coating containing not more than about 5 to 10 pounds of paraffin per each 10,000 square feet of fruit surface treated.

12. The process of protectively treating fresh fruit which comprises applying to the fruit an excess of protective material and preliminarily distributing it over the fruit by contacting the fruit with a rubbing surface moving at a predetermined rate of speed, and then subjecting the fruit to the action of a rubbing surface moving at a substantially higher rate of speed.

13. The process of protectively treating fresh fruit which comprises applying to the fruit an excess of protective material and preliminarily distributing it over the fruit by contacting the fruit with a rubbing surface moving at a predetermined rate of speed, and then subjecting the fruit to the action of a rubbing surface moving at a speed from two to five times as great as that of the first-mentioned surface.

14. The process of protectively treating fresh fruit which comprises applying to the fruit an excess of protective material and preliminarily distributing it over the fruit by means of a brush-roll rotating at between about 125 to 150 R. P. M., and then subjecting said fruit to the rubbing action of another brush-roll rotating at between about 175 to 700 R. P. M.

15. The process of treating fresh fruit which comprises applying thereto a fluid protective material adapted to cleanse the surface of the fruit and also to provide a protective coating therefor, thoroughly rubbing said fruit to distribute said material all over the surface thereof, and then subjecting said fruit to more vigorous rubbing to remove surplus material and any foreign matter associated therewith and to spread residual material out into a protective film of extreme thinness.

16. The process of treating fresh fruit which comprises applying a protective material thereto and spreading said material out over the surface of the fruit in a very thin film coating by subjecting said fruit with said material thereon to the rubbing action of a suitable surface moving in contact with the fruit at a speed at least as great as the surface speed of a 10-inch brush-roll driven at 300 R. P. M.

17. The process of treating fresh fruit which comprises applying a protective material thereto and spreading said material out over the surface of the fruit in a very thin film coating by subjecting said fruit with said material thereon to the rubbing action of a suitable surface moving in contact with the fruit at a speed equivalent to the surface speed of a 10-inch brush-roll driven at 175 to 700 R. P. M.

18. The process set forth in claim 16, further characterized by the fact that said protective material comprises a waxy substance.

19. The process set forth in claim 17, further characterized by the fact that said protective material comprises a waxy substance.

20. The process set forth in claim 17, further characterized by the fact that said protective material comprises a waxy substance, and that the fruit is caused to turn on different axes during the rubbing.

21. The process of treating fresh fruit which comprises initially applying an excess of waxy protective material in fluent condition to the surface of fruit and preliminarily distributing it thereover by rubbing, then rubbing more vigorously to spread the material out into a very thin film-coating on the fruit.

22. The process of treating fresh fruit which comprises applying to fruit with the aid of relatively low-speed rotary rubbing means protective material comprising a waxy substance and a refined light mineral oil having a flash point at least as high as that of kerosene, and then subjecting said fruit to more vigorous rubbing by the action of higher-speed rotary rubbing means.

23. The process of treating fresh fruit which comprises applying protective material to fruit with the aid of rotary brush-roll mechanism operated to give a brushing-surface speed not substantially exceeding that of a 10-inch brush-roll driven at 150 R. P. M., then subjecting said fruit to more vigorous rubbing by the action of brush-roll mechanism operated to give a brushing-surface speed not substantially less than that of a 10-inch brush-roll driven at 300 R. P. M.

24. The process set forth in claim 22, further characterized by the fact that said protective material also has a cleansing action on the fruit and that a predetermined interval of time is allowed to intervene between the stated rubbing operations in order to enhance said cleansing action.

25. The process set forth in claim 23, further characterized by the fact that said protective material also has a cleansing action on the fruit and that a predetermined interval of time is allowed to intervene between the stated rubbing operations in order to enhance said cleansing action.

26. The process set forth in claim 12, further characterized by the fact that said protective material comprises a constituent that is normally substantially solid, intimately mixed with a liquid vehicle for said constitutent, and by the fact that the fruit after being rubbed is subjected to an evaporating treatment to remove at least a part of said liquid vehicle from the coating thereon.

27. The process set forth in claim 16, further characterized by the fact that said protective material comprises a constituent that is normally substantially solid, intimately mixed with a liquid vehicle for said constituent, and by the fact that the fruit after being rubbed is subjected to an evaporating treatment to remove at least a part of said liquid vehicle from the coating thereon.

28. The process set forth in claim 17, further characterized by the fact that said protective material comprises a constituent that is normally substantially solid, intimately mixed with a liquid vehicle for said constituent, and by the fact that the fruit after being rubbed is subjected to an evaporating treatment to remove at least a part of said liquid vehicle from the coating thereon.

29. The process set forth in claim 21, further characterized by the fact that said protective material comprises a constituent that is normally substantially solid, intimately mixed with a liquid vehicle for said constituent, and by the fact that the fruit after being rubbed is subjected to an evaporating treatment to remove at least a part of said liquid vehicle from the coating thereon.

30. The process of protecting fruit which comprises applying protective material thereto in soft spreadable condition and subjecting the fruit for at least about 5 seconds to the rubbing action of a rubbing element whose rubbing surface moves at a speed at least as great as the surface speed of a 10-inch brush-roll driven at 100 R. P. M.

31. The process of treating fresh fruit which comprises applying protective material thereto in soft spreadable condition and subjecting the fruit for at least about 10 seconds to the rubbing action of a suitable surface moving in contact with the fruit at a speed at least as great as the surface speed of a 10-inch brush-roll driven at 100 R. P. M.

32. The process set forth in claim 12, further characterized by the fact that the protective material is a fluid composition comprising from about 5 to not substantially more than 20 per cent of a waxy substance, such as paraffin.

33. The process set forth in claim 17, further characterized by the fact that the protective material is a fluid composition comprising from about 5 to not substantially more than 20 per cent of a waxy substance, such as paraffin.

34. The process set forth in claim 22, further characterized by the fact that the protective material is a fluid composition comprising from about 5 to not substantially more than 20 per cent of a waxy substance, such as paraffin.

35. The process set forth in claim 23, further characterized by the fact that the protective material is a fluid composition comprising from about 5 to not substantially more than 20 per cent of a waxy substance, such as paraffin.

36. The process set forth in claim 30, further characterized by the fact that the protective material is a fluid composition comprising from about 5 to not substantially more than 20 per cent of a waxy substance, such as paraffin.

37. Apparatus for treating fruit comprising the combination, with rubbing means providing a runway for fruit, of compressed-air spray means mounted to direct spray upon said runway, means for delivering fluid treating material and compressed-air to said compressed-air spray means, and means for heating both the treating material and compressed air so delivered.

38. The process of treating fresh fruit which comprises spraying upon fruit a wax-containing protective material by means of a compressed gas, both said protective material and said gas being preheated, and thoroughly rubbing the fruit to distribute said material thereover in a thin film.

39. The process of treating fresh fruit which comprises spraying upon fruit a fluid composition comprising paraffin and a solvent thereof by means of compressed air, both said composition and said compressed air being preheated, and thoroughly rubbing the fruit to distribute said composition thereover in a thin film.

40. The process of treating fresh fruit which comprises applying protective material thereto in spreadable condition and subjecting said fruit to the rubbing action of a suitable surface moving in contact with the fruit at a speed at least as great as the surface speed of a 10-inch brush-roll driven at 300 R. P. M., until said protective material is spread out over the surface of the fruit to provide therefor a continuous film-like, adherent, enclosing envelope of such extreme thinness as not to stop transpiration but nevertheless sufficient to materially retard shrinkage and withering.

41. The process of treating fresh fruit which comprises applying protective material thereto in spreadable condition and subjecting said fruit to the rubbing action of a suitable surface moving in contact with the fruit at a speed at least as great as the surface speed of a 10-inch brush-roll driven at 300 R. P. M., until said protective material is spread out over the surface of the fruit to provide therefor a continuous film-like, adherent, enclosing envelope of such extreme thinness as not to stop transpiration but nevertheless sufficient to materially retard shrinkage and withering, the fruit being caused to turn upon different axes during the rubbing.

In testimony whereof I hereunto affix my signature.

ERNEST M. BROGDEN.